(12) United States Patent
Karpenko et al.

(10) Patent No.: US 11,655,864 B2
(45) Date of Patent: *May 23, 2023

(54) NOISE REDUCING BRAKE PADS

(71) Applicant: FORD GLOBAL TECHNOLOGIES, LLC, Dearborn, MI (US)

(72) Inventors: Yuri Anatoly Karpenko, Brighton, MI (US); Charles K. Evans, Wilis, MI (US); J. Chris Oakwood, West Bloomfield, MI (US); Peter Kowalow, Windsor (CA)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 755 days.

This patent is subject to a terminal disclaimer.

(21) Appl. No.: 16/543,178

(22) Filed: Aug. 16, 2019

(65) Prior Publication Data

US 2019/0368559 A1    Dec. 5, 2019

Related U.S. Application Data

(63) Continuation of application No. 14/843,008, filed on Sep. 2, 2015, now Pat. No. 10,428,884.

(51) Int. Cl.
*F16D 65/00* (2006.01)
*F16D 65/092* (2006.01)
*F16D 65/02* (2006.01)

(52) U.S. Cl.
CPC ....... *F16D 65/0006* (2013.01); *F16D 65/092* (2013.01); *F16D 2065/026* (2013.01)

(58) Field of Classification Search
CPC ............... F16D 65/0006; F16D 65/092; F16D 2065/026; F16D 2069/004; F16D 69/00
See application file for complete search history.

(56) References Cited

U.S. PATENT DOCUMENTS

| 5,145,037 A | 9/1992 | Kobayashi et al. |
| 5,456,339 A | 10/1995 | Zeng |

(Continued)

FOREIGN PATENT DOCUMENTS

| CN | 201434031 Y | 3/2010 |
| DE | 102012224152 A1 | 10/2014 |

(Continued)

OTHER PUBLICATIONS

Bendix: Measuring a Brake Pad, Sep. 26, 2011.

(Continued)

*Primary Examiner* — Pamela Rodriguez
(74) *Attorney, Agent, or Firm* — Burr & Forman LLP; Lorne Forsythe

(57) ABSTRACT

A brake pad for a motor vehicle is provided. The brake pad includes a body having an upper edge and a lower edge. The upper edge is configured for positioning relative to an outer diameter of a rotor. The brake pad also includes a friction surface extending between the upper edge and the lower edge for engaging the rotor. The brake pad further includes a relieved portion located along a section of the upper edge. The relieved portion is configured to reduce squeal noise caused by tangential modes of the rotor, during engagement of the brake pad with the rotor, by minimizing contact between the friction surface of the brake pad and the outer diameter of the rotor at an area of the rotor having a potential for high modal displacement in a tangential direction.

20 Claims, 9 Drawing Sheets

(56) References Cited

U.S. PATENT DOCUMENTS

| | | | |
|---|---|---|---|
| 6,032,767 | A | 3/2000 | Roehling |
| 6,481,544 | B2 | 11/2002 | Brecht et al. |
| 7,275,625 | B2 | 10/2007 | Oi et al. |
| 7,322,448 | B2 | 1/2008 | Hulten |
| 8,151,433 | B2 | 4/2012 | Liu et al. |
| 8,505,698 | B2 | 8/2013 | Liu et al. |
| 8,689,421 | B2 | 4/2014 | Liu et al. |
| 2008/0169161 | A1 | 7/2008 | Chern |
| 2009/0071766 | A1 | 3/2009 | Gaulrapp et al. |
| 2012/0073915 | A1 | 3/2012 | Kahan et al. |
| 2016/0003317 | A1 | 1/2016 | Buxton et al. |

FOREIGN PATENT DOCUMENTS

| | | | |
|---|---|---|---|
| DE | 102017204714 A1 * | 6/2018 | |
| JP | 02102932 A | 4/1990 | |
| KR | 100580480 B1 | 7/2005 | |
| KR | 1020060053603 A | 5/2006 | |
| KR | 20180094070 A * | 8/2018 | |

OTHER PUBLICATIONS

Weiming Liu, et al. "A Rapid Design Tool and Methodology for Reducing High Frequency Brake Squeal", SAE International 2006-01-3205, Oct. 8-11, 2006.

Non-Final Office Action in U.S. Appl. No. 14/843,008, dated Aug. 3, 2016.

Final Office Action in U.S. Appl. No. 14/843,008, dated Dec. 29, 2016.

Notice of Allowance in U.S. Appl. No. 14/843,008, dated May 3, 2019.

* cited by examiner

NOISE REDUCING BRAKE PADS

CROSS-REFERENCE TO RELATED APPLICATIONS

This application is a Continuation of U.S. application Ser. No. 14/843,008, filed Sep. 2, 2015 and issued as U.S. Pat. No. 10,428,884 on Oct. 1, 2019, which is incorporated by reference herein in its entirety.

TECHNICAL FIELD

The present disclosure relates generally to brake pads that reduce brake squeal noise. More specifically, the present disclosure relates to brake pads that reduce brake squeal noise caused by brake rot or tangential modes.

BACKGROUND

Motor vehicle disc brake systems generally utilize a disc brake rotor at each respective wheel (see FIG. 7). Each rotor, for example, generally includes two oppositely-facing annular friction surfaces which, during operation of the brakes, are engaged by two blocks of friction material (e.g., brake pads) that are moved towards one another into contact with the two friction surfaces so that frictional forces occur and slow the rotation of the rotor, and hence the wheel of the vehicle.

Accordingly, to slow and/or stop a vehicle, disc brake systems convert most of the kinetic energy of the vehicle to thermal energy primarily through the frictional forces between the brake pads and the rotors of the vehicle. A small amount of this kinetic energy, however, may also become vibrational energy within the brake system in both the brake pads (i.e., brake pad vibration) and rotors (i.e., rotor vibration). Thus, when damping of the brake system is low (which is often the case in the automotive industry), such vibration can result in radiation of high frequency sounds (e.g., over 1 kHz) from the brake system, otherwise referred to as squeal noise. In other words, squeal noise may be created by the dynamic instability of the brake system when the brake system linear vibration modes (i.e., pad and rotor vibrations) are placed closely in their resonant frequency range, and there is sufficient energy input to merge the modes, thereby creating an unstable complex system mode.

While this squeal noise does not indicate any functional imperfections or mechanical problems in the brake system, it may affect the driver's perception of the vehicle's quality and the integrity of the brake system itself, which may lead, for example, to unnecessary warranty claims and costs. Accordingly, various countermeasures may be employed to address squeal noise problems, including, for example: 1) separating the brake system linear modes to prevent their merging, and/or 2) reducing the energy input from the rotor/pad interaction.

Traditional solutions for addressing brake squeal noise have, however, been generally focused on the separation between pad and rotor modes, where pad modes that align with rotor modes are modified to shift their natural frequencies away from the rotor mode frequencies. In other words, traditional solutions for addressing brake squeal noise have generally been focused on brake pad vibration (i.e., brake pad free-free vibration modes), without addressing rotor vibration (i.e., brake rotor tension-compression natural vibration modes) or accounting for rotor mode contribution such as rotor tangential modes.

It may, therefore, be advantageous to provide a brake pad design that may reduce energy input from the pad to the rotor that could otherwise excite rotor tangential modes, thus providing a brake pad design that addresses and accounts for the rotor mode contribution to squeal noise.

SUMMARY

In accordance with various exemplary embodiments, a brake pad for a motor vehicle may include a body having upper and lower edges, a friction surface extending between the upper and lower edges for engaging a rotor, and a notch located along a section of the upper edge, wherein the notch has an arc length of about ¼ to about ½ of an arc length of the pad and a depth of about ⅛ to about ⅙ of a height of the pad, and wherein, during engagement with the rotor, the notch is configured to reduce squeal noise caused by tangential modes of the rotor.

In accordance with various exemplary embodiments, a brake pad assembly for a motor vehicle may include a rigid backing structure, and a friction material carried by the rigid backing structure, the friction material having a notch located at a midpoint of an upper edge of the material, wherein the notch has an arc length of about ¼ to about ½ of an arc length of the pad and a depth of about ⅛ to about ⅙ of a height of the pad, and wherein, during braking of the motor vehicle, the notch is configured to reduce squeal noise caused by rotor tangential modes.

In accordance with various exemplary embodiments a method of reducing brake squeal noise from rotor tangential modes may include removing a portion of a brake pad along a section of an upper edge of the pad, the portion being positioned and sized to prevent contact between a friction surface of the pad and a rotor, during engagement of the friction surface with the rotor, at an area of the rotor having a potential for high modal displacement in a tangential direction.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles of the disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

Figure 1:
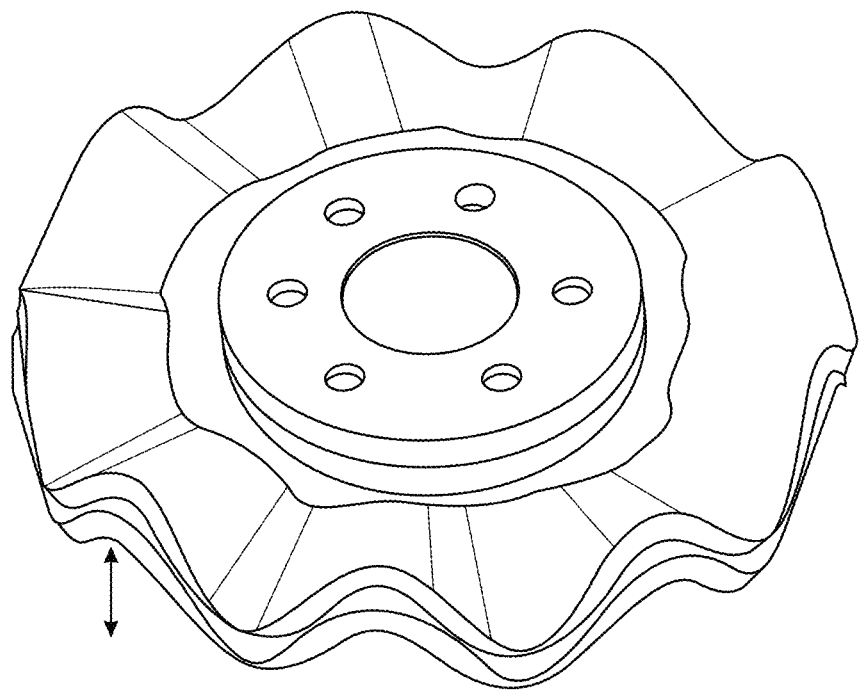
FIG. 1 is a perspective view of a brake rotor illustrating out-of-plane vibrations associated with a bending mode of the rotor.
Figure 7:
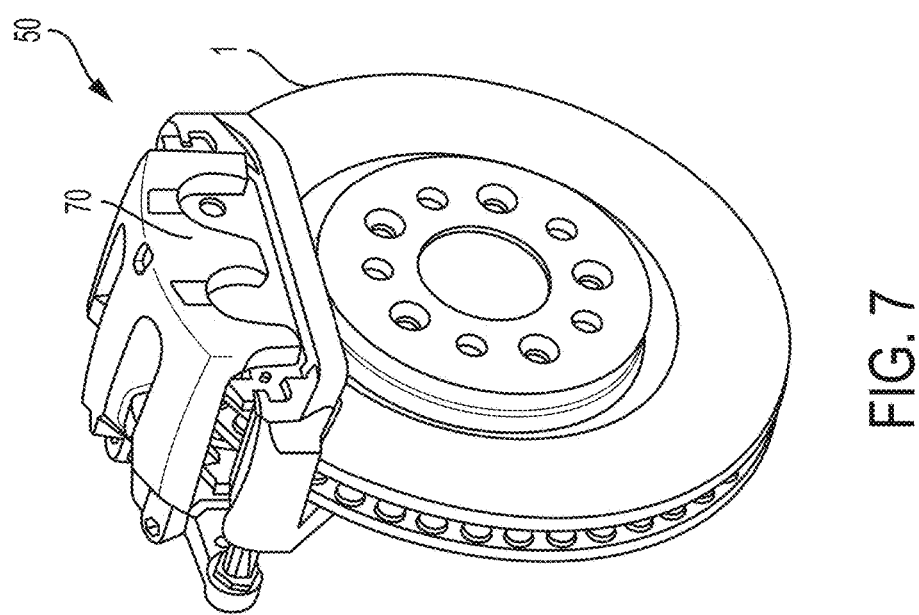
FIG. 7 is a perspective view of an exemplary disk braking system in accordance with the present disclosure.

As above, during a braking event, the rotor and pads of a disk braking system, such as, for example, a system 50 as illustrated in FIG. 7, may experience both normal and tangential forces at their interface. Forces acting normal to the rotor and pad surfaces (i.e., normal forces) can induce bending or out-of-plane vibrations in the rotor and pad, which can be associated with rotor bending modes as illustrated, for example, in FIG. 1. Forces acting tangentially on the surfaces of the rotor (i.e., tangential forces) also may develop tension-compression vibrations within the rotor, which can be associated with rotor tangential modes (otherwise referred to as in-plane or circumferential modes) as illustrated, for example, in FIG. 2. These modes result in radiation of high frequency sounds from the brake system, otherwise referred to as squeal noise.

In the audible frequency range (i.e., about 20 Hz to about 20 kHz) a typical disk brake rotor 1 (see FIGS. 3 and 4) has up to 20 pairs (sin and cosine) of the bending modes and 3 pairs (sin and cosine) of the tangential modes at distinct resonant frequencies. The three rotor tangential modes are illustrated, for example, in FIGS. 3A-3C. As above, while both bending and tangential rotor modes can be responsible for brake squeal noise generation, the bending modes contribution to squeal noise is already well studied and understood, resulting in a variety of effective countermeasures available when needed. For example, the length of lining material on the brake pads may be shortened to avoid modal alignment between the pad and rotor bending modes, which can promote the creation of system unstable modes. At the same time, however, the generation of squeal noises due to the rotor tangential modes often is not addressed. Various embodiments of the present disclosure, therefore, contemplate providing effective countermeasures against squeal noises produced by rotor tangential modes.

Figure 3A:
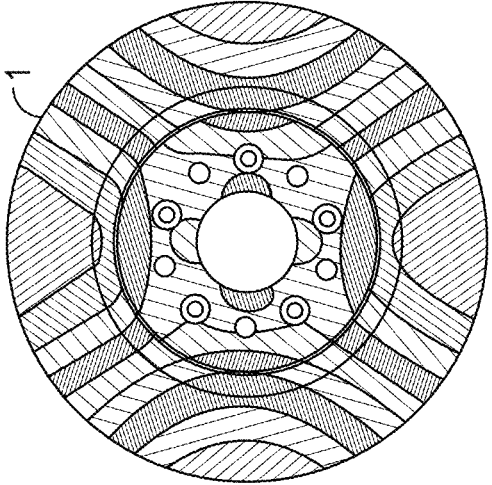
FIGS. 3A-3C are schematic views of a brake rotor illustrating three different tangential modes of the rotor.
Figure 3A:
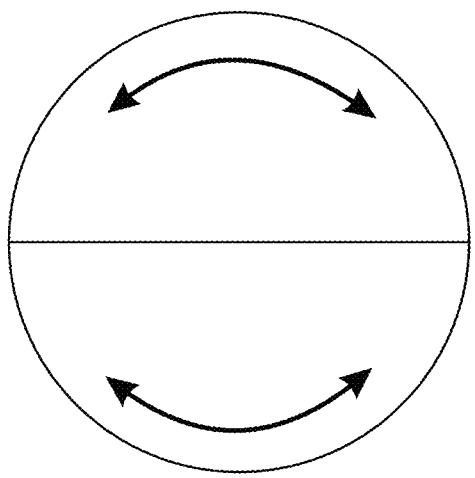
Figure 3B:
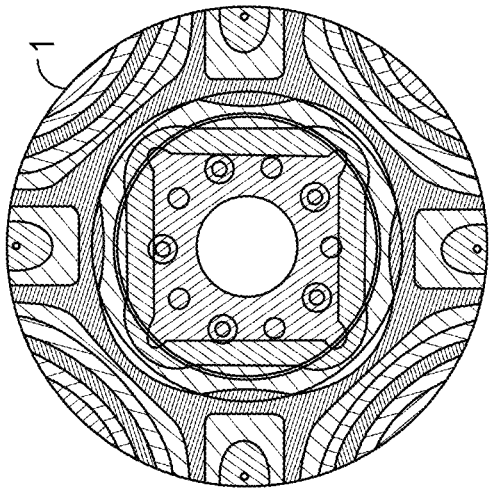
Figure 3B:
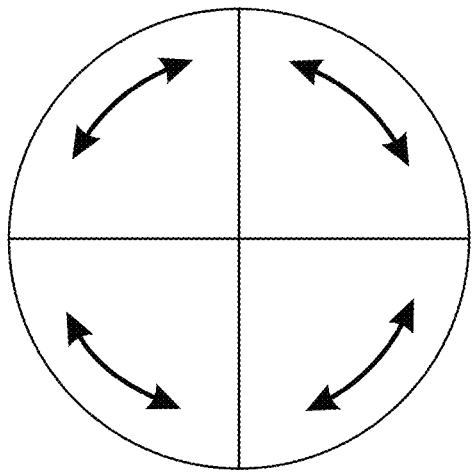
Figure 3C:
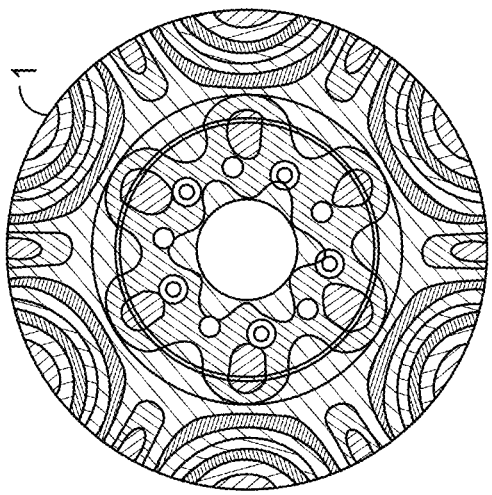
Figure 3C:
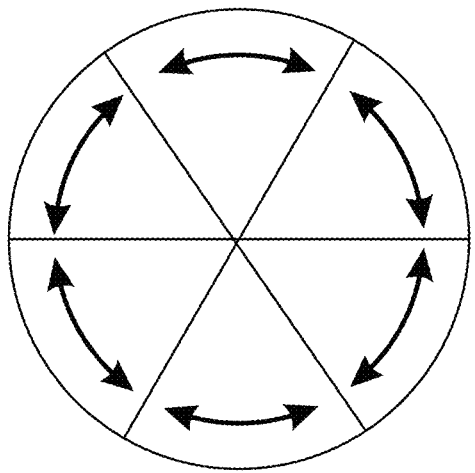
Figure 4:
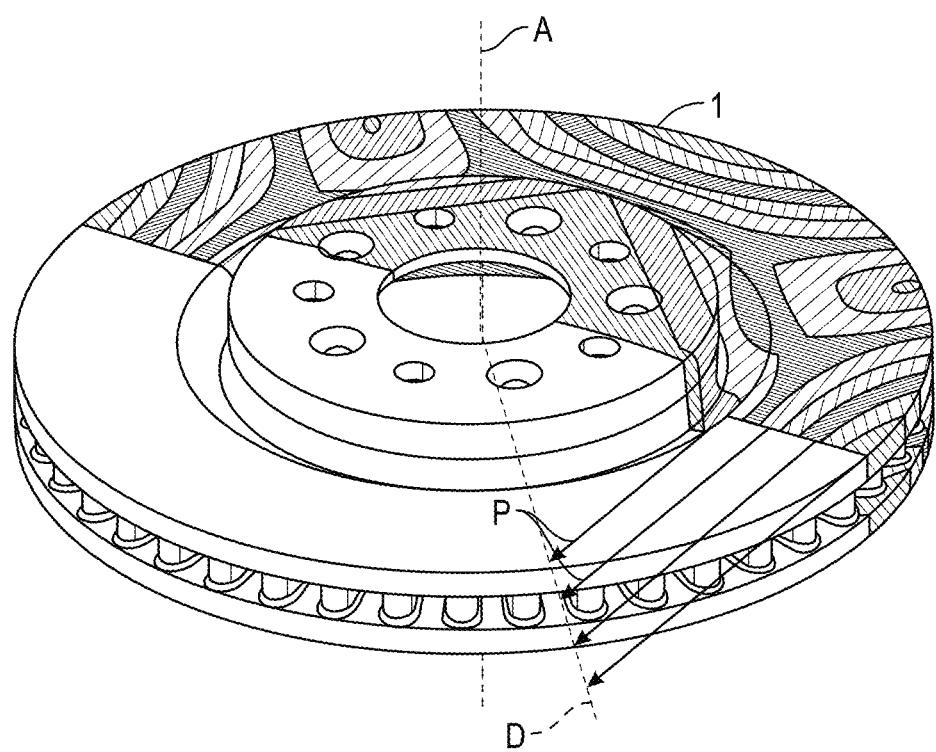
FIG. 4 is a perspective view of the rotor of FIGS. 3A-3C illustrating the tangential mode of FIG. 3B in greater detail.

In accordance with various embodiments, for example, the present disclosure contemplates a brake pad design that may reduce the energy input from the surface contact between the pad and rotor surfaces, which would otherwise excite rotor tangential modes, thereby eliminating any potential for brake squeal noise caused by such modes. FIG. 4, for example, is a perspective view of the rotor 1 of FIGS. 3A-3C illustrating the tangential mode of FIG. 3B in greater detail. As shown in FIG. 4, in the rotor tangential mode, points P on a diametric line D move in phase in the tangential (or circumferential) direction, wherein the absolute vibration amplitude increases along with the distance from the rotor axis A and has its maximum value at the outer diameter of the rotor 1. Thus, the easiest way to excite the rotor tangential mode is to excite the rotor at the outer diameter of the rotor in its circumferential direction.

Figure 5:
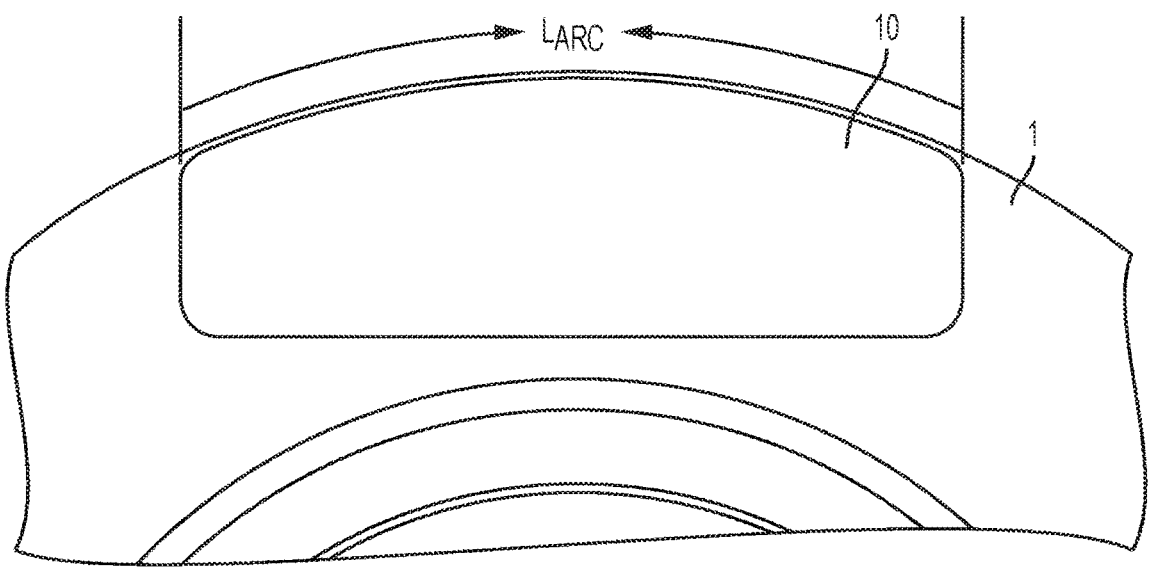
FIG. 5 is a schematic view of a conventional brake pad positioned on a rotor.

As illustrated in FIG. 5, when engaged with the rotor 1 (i.e., during a braking event), a conventional brake pad 10 generally covers the outer diameter of the rotor within an arc length $L_{arc}$ of the pad 10. Therefore, the pad 10 has a tendency to excite the rotor tangential modes via the surface contact between the pad 10 and the rotor 1 at the outer diameter of the rotor 1. Various embodiments of the present disclosure, therefore, propose a unique brake pad design that minimizes the surface contact between the pad and rotor at the outer diameter of the rotor 1.

In accordance with various embodiments, for example, the present disclosure contemplates brake pads having a notch located along a section of an upper edge of the pad to reduce the surface contact between the pad and rotor at the outer diameter of the rotor. In other words, each of the exemplary brake pads described herein has a notch that is positioned along the arc length $L_{arc}$ of the pad, wherein the arc length $L_{arc}$ is configured to align with the outer diameter of the rotor when the pad is engaged with the rotor. The pad, therefore, does not cover the entire outer diameter of the rotor (i.e., with its arc length $L_{arc}$), which functions to shift down the effective radius of the surface contact area (i.e., between the pad and rotor), thereby reducing the energy input from the rotor/pad interaction to prevent excitation of the rotor tangential modes.

Figure 2:
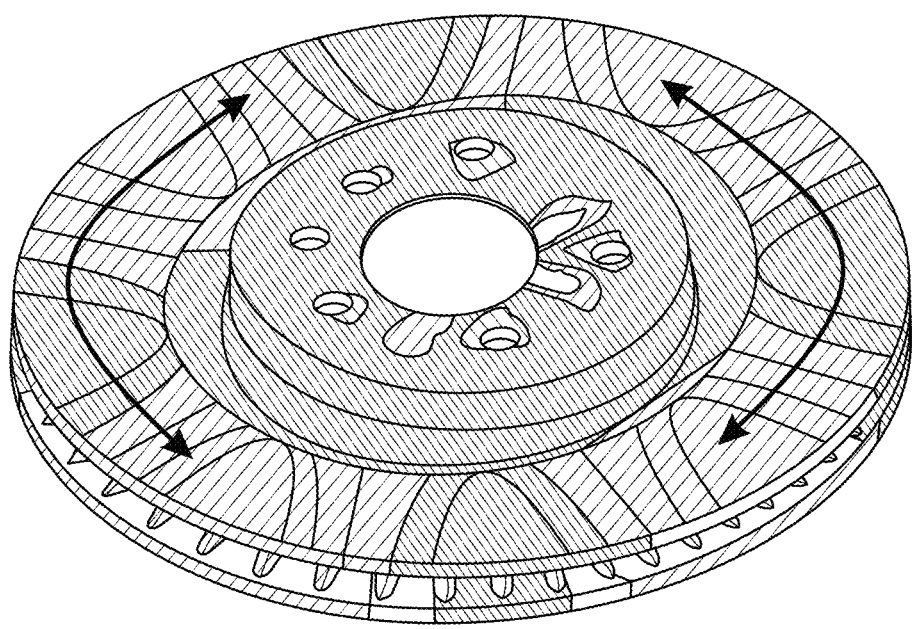
FIG. 2 is a perspective view of a brake rotor illustrating tension-compression vibrations associated with a tangential mode of the rotor.

As described above, as used herein the terms "rotor tangential modes" or "tangential modes of the rotor" refer to the forces acting tangentially on the surfaces of a brake rotor (i.e., tangential forces), which develop tension-compression vibrations within the rotor as illustrated, for example, in FIG. 2. These modes are known to result in radiation of high frequency sounds from the brake system, otherwise referred to as squeal noise.

Figure 6:
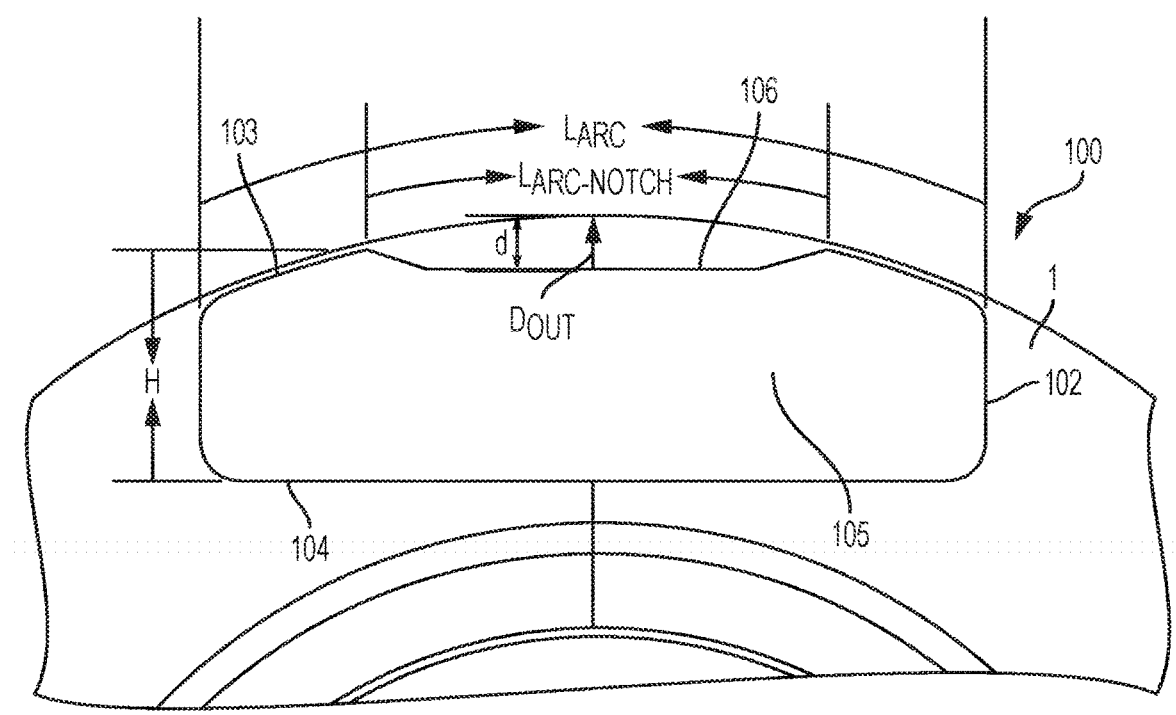
FIG. 6 is a schematic view of an exemplary brake pad in accordance with the present disclosure positioned on a rotor.

FIG. 6 illustrates an exemplary embodiment of a brake pad 100 in accordance with the present disclosure. The brake pad 100 includes a body 102 having an upper edge 103, a lower edge 104, and a friction surface 105 extending between the upper and lower edges 103, 104. As above, when positioned within a braking system (see FIGS. 7 and 8) of a vehicle (not shown), the friction surface 106 is configured to engage a rotor, such as, for example, the rotor 1 to stop and/or slow the vehicle.

Figure 8:
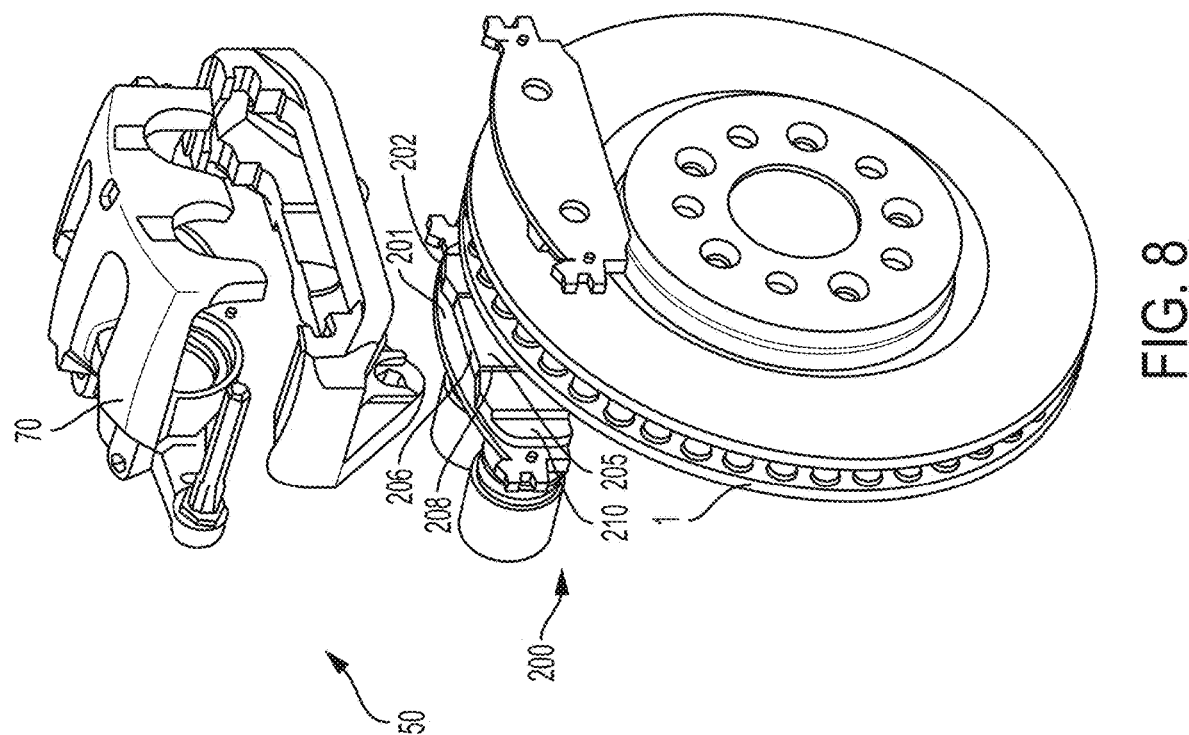
FIG. 8 is an exploded view of the disk braking system of FIG. 7 illustrating an exemplary embodiment of a brake pad assembly in accordance with the present disclosure.

In various embodiments, for example, brake pads in accordance with the present disclosure may comprise an assembly including a rigid backing structure and a friction material that is carried by the rigid backing structure. As illustrated in FIGS. 7 and 8, a brake pad assembly 200 may include a rigid backing structure 201, such as, for example, a metallic backing plate, and a friction material 202 that is carried by the rigid backing structure 201. The friction material 202 is made, for example, from a material and/or combination of materials which have a high coefficient of friction and which may also absorb and disperse large amounts of heat. In various embodiments, for example, the friction material 202 may include a non-asbestos organic, semi-metallic, and/or ceramic material.

Those of ordinary skill in the art would understand, however, that brake pad assemblies in accordance with the present disclosure may include various types and/or configurations of backing structures and friction materials, which are formed from various materials, based on a particular braking application. Furthermore, brake pad assemblies in accordance with the present disclosure may include additional components and/or materials, including, for example, a shim (not shown) attached to an outer surface of the backing structure to help correct small differences (which may sometimes also lead to noise) between the backing structure and a caliper to which it is attached.

As perhaps best shown in FIG. 8, in various exemplary embodiments, the friction material 202 is bound to a surface of the backing plate 201 to create a friction surface 205 that is configured to face the brake rotor 1 when positioned within the motor vehicle (not shown), and an opposite surface of the backing plate 201 is configured to be attached to a caliper 70 when positioned within the vehicle. In various embodiments, for example, two brake pads (i.e., assemblies 200) may be contained within the brake caliper 70 (i.e., positioned over a cheek portion of the rotor 1) with their friction surfaces 205 facing the rotor 1. In this manner, when the brakes are applied, the caliper 70 clamps or squeezes the two pads 200 together onto the spinning rotor 1 to slow and/or stop the vehicle.

With reference again to FIG. 6, the body 102 of the pad 100 further includes a notch 106 that is located along a section of the upper edge 103 of the pad 100, such as, for example, a center section of the upper edge 103 as shown in FIG. 6. And, as above, the notch 106 is configured to reduce squeal noise caused by tangential modes of the rotor 1 during engagement of the pad 100 with the rotor 1. In other words, the notch 106 is positioned and sized, such that during engagement with the rotor 1, there is minimal contact between the friction surface 105 of the pad 100 and the rotor 1 at or near an outer diameter $D_{out}$ of the rotor 1 in a circumferential direction C. As above, for example, with reference to FIG. 4, the absolute vibration amplitude of the rotor 1 increases along with the distance from the rotor axis A with a maximum value at the outer diameter $D_{out}$ of the rotor 1. Accordingly, depending on the resonant frequency that may be created in the rotor 1, and the corresponding tangential mode related to that frequency (see FIGS. 3A-3C), various areas along the outer diameter $D_{out}$ of the rotor 1 may have potential for high modal displacement in a tangential direction of the rotor 1. Thus, in various embodiments, the notch 106 may be positioned and sized such that, during engagement with the rotor 1, the brake pad 100 does not cover the entire outer diameter $D_{out}$ of the rotor 1 (i.e., with its arc length $L_{arc}$), such that there is relatively no contact between the friction surface 105 and the rotor 1 at an area of the rotor 1 having a potential for high modal displacement in a tangential direction.

In various embodiments, for example, the notch 106 is u-shaped, with an arc length $L_{arc\text{-}notch}$ and a depth d, and is centered along a midpoint of an arc length Lam of the brake pad 100. In this manner, when the brake pad 100 is engaged with the rotor 1, the brake pad will not cover the entire outer diameter $D_{out}$ of the rotor 1 along its arc length $L_{arc}$, thereby shifting down the effective radius of the contact area between the friction surface 105 and the rotor 1. Although, to maximize squeal noise reduction, it may be considered optimal to shift down the effective radius of the contact area across the total arc length $L_{arc}$ of the pad 100 (and not just along a portion of the arc length $L_{arc}$), it may not always be feasible to do so. For example, when in use, a surface corrosion layer may develop at the rotor surface not swept by the pad 100, which may impact the overall appearance of the brake rotor 1 and affect customer perception of the quality of the vehicle.

Accordingly, in accordance with various embodiments, the arch length $L_{arc}$ notch of the notch 106 does not exceed about 50% of the total arc length $L_{arc}$ of the pad 100. It is generally considered that such a configuration will ensure that there is enough remaining lining material to clean up surface corrosion layers that could develop when, for example, the vehicle is parked in humid conditions. Thus, in various exemplary embodiments, the arch length $L_{arc\text{-}notch}$ of the notch 106 is about ¼ to about ½ the arc length $L_{arc}$ of the pad 100, and the depth d of the notch 106 is about ⅛ to about ⅙ of a height H of the pad 100. In other words, for brake pads most commonly used in the automotive industry, the arch length $L_{arc}$ notch of the notch 106 is about 40 mm to about 80 mm, and the depth d of the notch 106 is about 8 mm to about 12 mm.

The present disclosure, however, contemplates pads having any number, configuration (i.e., dimension and/or geometry), and/or shape of notches 106 based on a particular application. Those of ordinary skill in the art would understand, therefore, that the brake pad 100 illustrated in FIG. 6 is exemplary only and intended to illustrate one embodiment of the present disclosure. Accordingly, brake pads in accordance with the present disclosure may also have various dimensions, shapes, and/or configurations, without departing from the scope of the present disclosure and claims. Moreover, to further reduce brake squeal noise, brake pads in accordance with the present disclosure may also utilize other known methods and techniques in combination with the disclosed notch design. As illustrated in FIG. 8, various additional embodiments contemplate, for example, employing slots 208 and additional notches 210 in combination with a notch 206 (the disclosed notch design) in order to also address squeal noise caused, for example, by rotor bending modes (i.e., to address noise issues not caused by rotor tangential modes).

A disk brake system utilizing a brake pad design in accordance with the present disclosure, similar to the brake pad 100 illustrated and described above with reference to FIG. 6, was modeled in Adams, a Multibody Dynamics (MBD) simulation software by MSC Software®. A disk brake system utilizing a conventional brake pad design similar to the brake pad 10 illustrated in FIG. 5 was also modeled in Adams for comparison purposes. To verify the expected noise reduction capabilities of the brake pads and assemblies in accordance with the present disclosure, brake system testing was conducted on a brake NVH dynamometer using SAE J2521 test procedure. The test results are shown in FIGS. 9-11.

Figure 9:
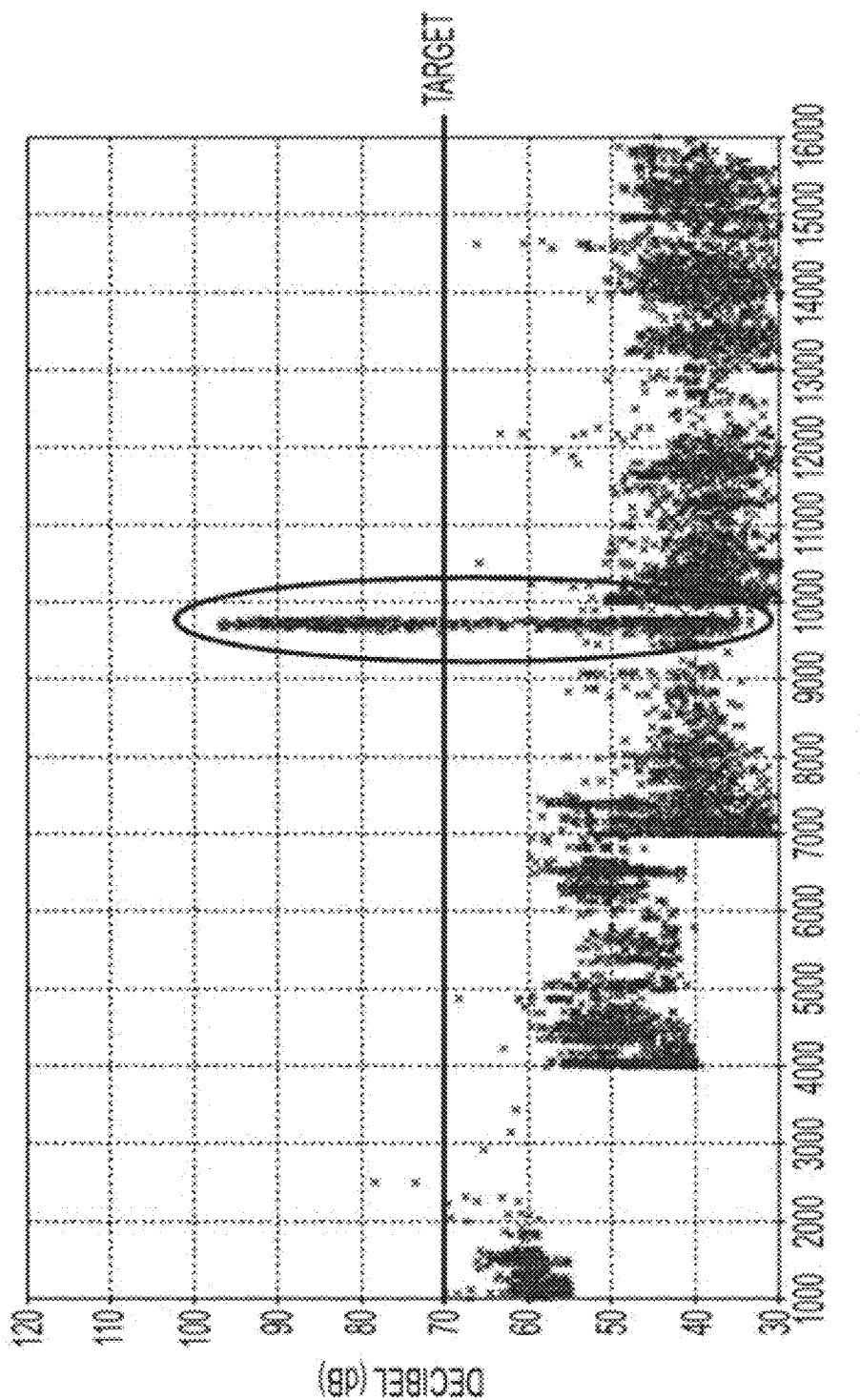
FIG. 9 is a graph illustrating brake noise associated with a conventional brake pad.
Figure 10:
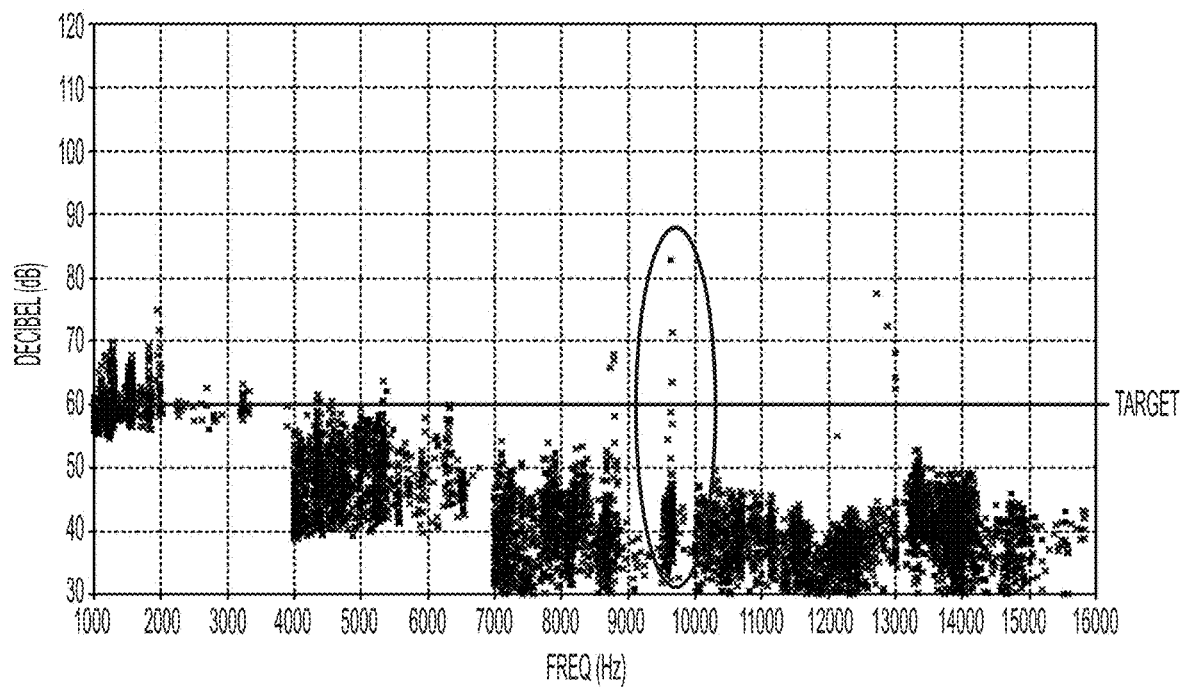
FIG. 10 is a graph illustrating brake noise associated with a brake pad in accordance with the present disclosure having a 7 mm deep notch.
Figure 11:
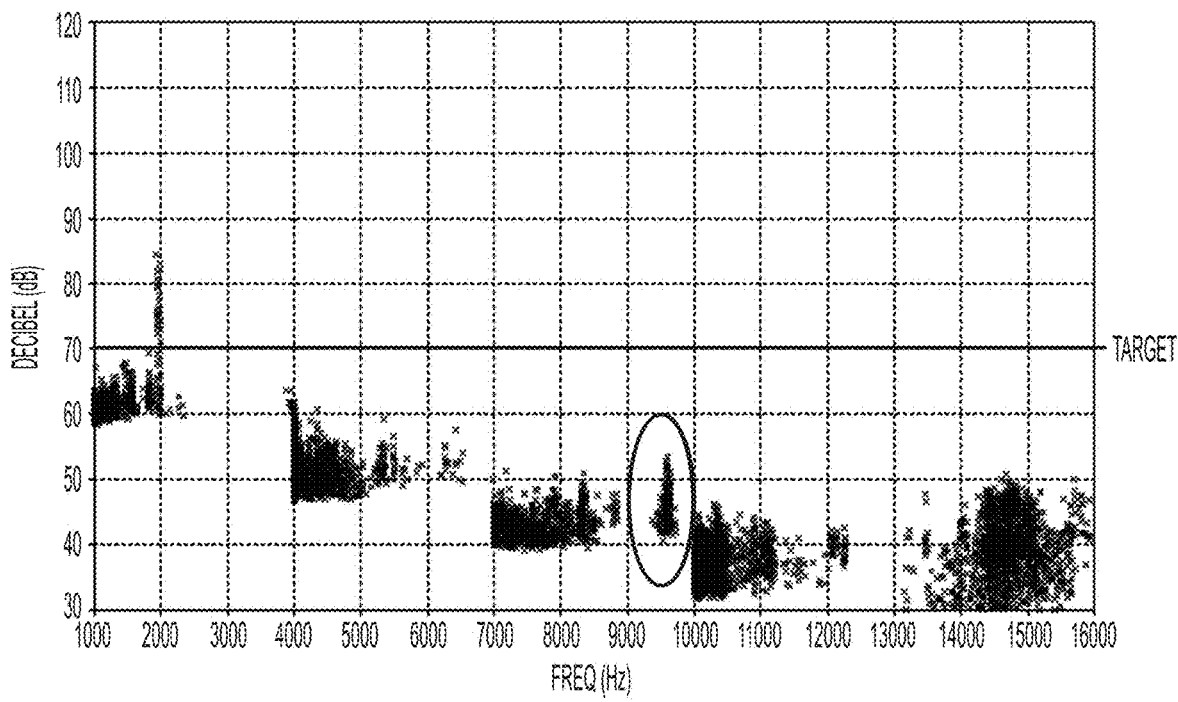
FIG. 11 is a graph illustrating brake noise associated with a brake pad in accordance with the present disclosure having a 10 mm deep notch.

FIGS. 9-11 are graphs respectively illustrating the rotor tangential mode at a frequency of 9.8 kHz for the conventional brake pad (with no notch), a brake pad having a 7 mm deep u-shaped notch, and a brake pad having a 10 mm deep u-shaped notch. As illustrated in FIG. 9, the squeal noise produced by the modeled conventional brake pad (via the rotor tangential mode) far exceeded the target established noise level. In other words, the conventional pad produced a maximum noise of about 88 decibels, which exceeded the target level (which would be considered acceptable to a driver of the vehicle) of 70 decibels as measured at the wheel end.

As illustrated in FIG. 10, although the squeal noise produced by the modeled brake pad with a 7 mm notch (via the rotor tangential mode) still exceeded the target established noise level in two instances, the occurrences of squeal noises exceeding the target was greatly reduced.

Finally, as illustrated in FIG. 11, the squeal noise produced by the modeled brake pad with a 10 mm notch (via the rotor tangential mode) was well below the target established noise level. In other words, the brake pad with the 10 mm notch produced a maximum noise of about 54 decibels, which was well below the target level of 70 decibels.

It was, therefore, determined that the disclosed brake pad design can significantly reduce brake squeal noise associated with rotor tangential modes, and that when utilizing notches having depths greater than about 8 mm, such noises may be completely reduced to an acceptable level.

The present disclosure further contemplates methods of reducing brake squeal noise from rotor tangential modes, such as, for example, by using the brake pads 100 described above with reference to FIG. 6. In accordance with various exemplary embodiments, to reduce brake squeal noise from rotor tangential modes, a portion of the brake pad 100 may be removed along a section of an upper edge 103 of the pad 100. As above, in accordance with various embodiments, the removed portion may be positioned and sized to prevent contact between a friction surface 105 of the pad 100 and a rotor 1, during engagement of the friction surface 105 with the rotor 1, at an area of the rotor 1 having a potential for high modal displacement in a tangential direction.

As above, with reference to FIG. 4, the absolute vibration amplitude of the rotor 1 increases along with the distance from the rotor axis A, with a maximum value at the outer diameter $D_{out}$ of the rotor 1. Accordingly, depending on the resonant frequency that may be created in the rotor 1, and the corresponding tangential mode related to that frequency (see FIGS. 3A-3C), various areas along the outer diameter $D_{out}$ of the rotor 1 may have potential for high modal displacement in a tangential direction of the rotor 1. Thus, as above, the removed portion may be positioned and sized such that, during engagement with the rotor 1, the brake pad 100 does not cover the entire outer diameter $D_{out}$ of the rotor (i.e., with its arc length $L_{arc}$), such that there is relatively no contact between the friction surface 105 and the rotor 1 at such areas. In other words, the removed portion may be positioned and sized to minimize contact between the friction surface 105 of the pad 100 and the rotor 1 at or near the outer diameter $D_0$ of the rotor 1 in a circumferential direction.

In various embodiments, for example, the removed portion may include a u-shaped portion, such as, for example, a u-shaped notch 106 that is located along a center section of the upper edge 103 of the pad 100. The notch 106 may have an arc length $L_{arc\text{-}notch}$ and a depth d, and be centered along a midpoint of an arc length $L_{arc}$ of the brake pad 100. In this manner, when the brake pad 100 is engaged with the rotor 1, the brake pad will not cover the entire outer diameter $D_{out}$ of the rotor 1 along its arc length $L_{arc}$, thereby shifting down the effective radius of the contact area between the friction surface 105 and the rotor 1. In various embodiments, for example, the arch length $L_{arc}$-notch of the notch 106 is about ¼ to about ½ the arc length $L_{arc}$ of the pad 100, and the depth d of the notch 106 is about ⅛ to about ⅙ of a height H of the pad 100. In other words, for brake pads most commonly used in the automotive industry, the arch length $L_{arc}$-notch of the notch 106 is about 40 mm to about 80 mm, and the depth d of the notch 106 is about 8 mm to about 12 mm.

As above, however, the present disclosure contemplates pads having any number, configuration (i.e., dimension and/or geometry), and/or shape of notches 106 based on a particular application.

While the present disclosure has been disclosed in terms of exemplary embodiments in order to facilitate better understanding of the disclosure, it should be appreciated that the disclosure can be embodied in various ways without departing from the principle of the disclosure. Therefore, the disclosure should be understood to include all possible embodiments which can be embodied without departing from the principle of the disclosure set out in the appended claims. Furthermore, although the present disclosure has been discussed with relation to automotive vehicles, those of ordinary skill in the art would understand that the present teachings as disclosed would work equally well for any type of vehicle having a braking system that utilizes pads and rotors.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:
1. A brake pad comprising:
a body having an upper edge and a lower edge, the upper edge being configured for positioning relative to an outer diameter of a rotor;
a friction surface configured to engage with the rotor during braking; and
a relieved portion located along a section of the upper edge and having an arc length, the relieved portion being configured to reduce squeal noise caused by tangential modes of the rotor, during engagement of the brake pad with the rotor, by minimizing contact between the friction surface of the brake pad and the outer diameter of the rotor at an area of the rotor having a potential for high modal displacement in a tangential direction;

wherein a surface contact centerline of the friction surface is defined by midpoints between the upper edge and the lower edge across a length of the friction surface, and wherein the surface contact centerline is furthest from the outer diameter of the rotor at a center of the arc length of the relieved portion.

2. The brake pad of claim 1, wherein the relieved portion is a notch.

3. The brake pad of claim 2, wherein the arc length the relieved portion is about ¼ to about ½ of an arc length of the brake pad.

4. The brake pad of claim 2, wherein the notch has a depth of about ⅛ to about ⅙ of a height of the brake pad.

5. The brake pad of claim 4, wherein the depth of the notch is about 8 mm to about 12 mm.

6. The brake pad of claim 1, wherein the relieved portion is centered along a midpoint of the upper edge of the brake pad.

7. The brake pad of claim 1, wherein the tangential modes include tension-compression natural vibration modes of the rotor.

8. The brake pad of claim 1, wherein the friction surface is a continuous planar surface extending from a perimeter of the body.

9. The brake pad of claim 8, wherein a perimeter shape of the friction surface has a same shape as a perimeter shape of the body.

10. A brake pad assembly for a motor vehicle, comprising:
a rigid backing structure; and
a friction material carried by the rigid backing structure, the friction material comprising an upper edge, a lower edge, a relieved portion, and a friction surface configured to engage with a rotor during braking, wherein the relieved portion has an arc length and is centered at an upper edge midpoint of the upper edge of the friction material,
wherein the relieved portion is configured such that, during braking of the motor vehicle, there is relatively no contact between the friction material and a rotor of the motor vehicle at an area of the rotor having a potential for high modal displacement in a tangential direction, such that, during the braking, the relieved portion reduces squeal noise caused by tangential modes of the rotor;
wherein a depth of the relieved portion is about ⅛ to about ⅙ of a height of the friction material or about 8 mm to about 12 mm;
wherein a surface contact centerline of the friction surface is defined by midpoints between the upper edge and the lower edge across a length of the friction surface, and wherein the surface contact centerline is furthest from an outer diameter of the rotor at a center of the arc length of the relieved portion.

11. The brake pad assembly of claim 10, wherein the relieved portion is a notch.

12. The brake pad assembly of claim 11, wherein the arc length of the relieved portion is about ¼ to about ½ of an arc length of the friction material.

13. The brake pad assembly of claim 10, wherein the relieved portion is positioned such that, during the braking, there is minimal contact between the friction material and the rotor at or near an outer diameter of the rotor in a circumferential direction.

14. A brake pad comprising:
a body having an upper edge and a lower edge, the upper edge having an arc portion configured to align relative to an arc of a rotor;
a friction surface configured to engage with the rotor during braking; and
a relieved portion located in the arc portion on the upper edge of the body and having an arc length, the relieved portion being configured to reduce squeal noise caused by tangential modes of the rotor, during engagement of the brake pad with the rotor, by minimizing contact between the friction surface of the brake pad and an outer diameter of the rotor at an area of the rotor having a potential for high modal displacement in a tangential direction;
wherein the relieved portion has a depth of about ⅛ to about ⅙ of a height of the brake pad;
wherein a surface contact centerline of the friction surface is defined by midpoints between the upper edge and the lower edge across a length of the friction surface, and wherein the surface contact centerline is furthest from the outer diameter of the rotor at a center of the arc length of the relieved portion.

15. The brake pad of claim 14, wherein the relieved portion is formed by removing a section of the arc portion such that a thickness of the relieved portion is less than a thickness of a remainder of the arc portion.

16. The brake pad of claim 14, wherein the arc length of the relieved portion is about ¼ to about ½ of an arc length of the brake pad.

17. The brake pad of claim 16, wherein the arc length of the relieved portion is about 40 mm to about 80 mm.

18. The brake pad of claim 14, wherein the relieved portion has a depth of about ⅛ to about ⅙ of a height of the brake pad.

19. The brake pad of claim 18, wherein the depth of the relieved portion is about 8 mm to about 12 mm.

20. The brake pad of claim 14, wherein the relieved portion is centered along a midpoint of the arc portion.

* * * * *